US012767846B2

(12) United States Patent
Kagata et al.

(10) Patent No.: US 12,767,846 B2
(45) Date of Patent: Oct. 20, 2026

(54) RECORDING METHOD AND INK SET

(71) Applicant: SEIKO EPSON CORPORATION, Tokyo (JP)

(72) Inventors: Takayoshi Kagata, Shiojiri (JP); Masakazu Ohashi, Shiojiri (JP); Masaya Ishida, Hara (JP); Hiroyasu Yamada, Minowa (JP)

(73) Assignee: SEIKO EPSON CORPORATION (JP)

( * ) Notice: Subject to any disclaimer, the term of this patent is extended or adjusted under 35 U.S.C. 154(b) by 126 days.

(21) Appl. No.: 18/807,074

(22) Filed: Aug. 16, 2024

(65) Prior Publication Data

US 2025/0059391 A1 Feb. 20, 2025

(30) Foreign Application Priority Data

Aug. 17, 2023 (JP) ................................ 2023-132833

(51) Int. Cl.
*C09D 11/40* (2014.01)
*B41J 2/21* (2006.01)
(Continued)

(52) U.S. Cl.
CPC ............ *C09D 11/40* (2013.01); *B41J 2/2107* (2013.01); *B41J 2/211* (2013.01); *B41J 2/2114* (2013.01);
(Continued)

(58) Field of Classification Search
CPC ....... C09D 11/40; C09D 11/322; C09D 11/38; C09D 11/102; C09D 11/36; C09D 11/30; C09D 11/32; C09D 11/324; C09D 11/328; C09D 11/101; C09D 11/005; C09D 11/54; C09D 11/52; C09D 11/106; C09D 11/326; C09D 11/107; C09D 11/03; C09D 11/037; C09D 11/033; C09D 11/108; B41J 2/2107; B41J 2/211; B41J 2/2114; B41J 2/2117; B41J 2/01; B41J 2/1433; B41J 2/17; B41J 2/17593; B41J 2/1755; B41J 2/2056; B41J 2/21; B41J 2/0057; B41J 3/60;
(Continued)

(56) References Cited

U.S. PATENT DOCUMENTS 4,882,220 A * 11/1989 Ono ...................... D06M 23/12
428/407
2003/0013369 A1 * 1/2003 Soane .................. D06M 23/12
442/181
(Continued)

FOREIGN PATENT DOCUMENTS

JP 2002-338863 A 11/2002

*Primary Examiner* — Manish S Shah
(74) *Attorney, Agent, or Firm* — Harness, Dickey & Pierce, P.L.C.

(57) ABSTRACT

A recording method of the present disclosure includes a fragrant ink adhesion step in which a fragrant ink containing microcapsules which enclose a fragrance is ejected by an ink jet method and is adhered to a recording medium and a color ink adhesion step in which a color ink containing a colorant, resin particles, and water is ejected by an ink jet method and is adhered to the recording medium. In the recording method described above, the fragrant ink and the color ink are adhered to the recording medium so as to be at least partially overlapped with each other thereon.

13 Claims, 4 Drawing Sheets

TABLE 1

| | PREPARATION EXAMPLE | | | | | | | | | | | | | | |
|---|---|---|---|---|---|---|---|---|---|---|---|---|---|---|---|
| | A1 | A2 | A3 | A4 | A5 | A6 | A7 | A8 | A9 | A10 | A11 | A12 | A13 | A14 | A15 |
| MICROCAPSULE 1 | 1.00 | – | – | – | – | 5.00 | 1.00 | 1.00 | 1.00 | 1.00 | – | – | – | – | – |
| MICROCAPSULE 2 | – | 1.00 | – | – | – | – | – | – | – | – | – | – | – | – | – |
| MICROCAPSULE 3 | – | – | 1.00 | – | – | – | – | – | – | – | – | – | – | – | – |
| MICROCAPSULE 4 | – | – | – | 1.00 | – | – | – | – | – | – | – | – | – | – | – |
| NON-MICROCAPSULIZED FRAGRANCE | – | – | – | – | 1.00 | – | – | – | – | – | – | – | – | – | – |
| MICROCAPSULE 5 | – | – | – | – | – | – | – | – | – | – | 1.00 | – | – | – | – |
| MICROCAPSULE 6 | – | – | – | – | – | – | – | – | – | – | – | 1.00 | – | – | – |
| MICROCAPSULE 7 | – | – | – | – | – | – | – | – | – | – | – | – | 1.00 | – | – |
| MICROCAPSULE 8 | – | – | – | – | – | – | – | – | – | – | – | – | – | 1.00 | – |
| MICROCAPSULE 9 | – | – | – | – | – | – | – | – | – | – | – | – | – | – | 1.00 |
| PROPYLENE GLYCOL | 20.00 | 20.00 | 20.00 | 20.00 | 20.00 | 20.00 | 50.00 | – | 20.00 | 20.00 | 20.00 | 20.00 | 20.00 | 20.00 | 20.00 |
| SAG503A | 0.25 | 0.25 | 0.25 | 0.25 | 0.25 | 0.25 | 0.25 | 0.25 | – | 0.25 | 0.25 | 0.25 | 0.25 | 0.25 | 0.25 |
| POLYURETHANE RESIN | – | – | – | – | – | – | – | – | – | 10.00 | – | – | – | – | – |
| PURE WATER | 78.75 | 78.75 | 78.75 | 78.75 | 78.75 | 74.75 | 48.75 | 98.75 | 79.00 | 68.75 | 78.75 | 78.75 | 78.75 | 78.75 | 78.75 |
| INK VISCOSITY (mPa·s) | 4.5 | 4.3 | 4.6 | 5.2 | 4.5 | 6.2 | 25.1 | 3.2 | 4.4 | 5.5 | 4.4 | 10.1 | 9.5 | 5.6 | 4.2 |

(51) Int. Cl.
*C09D 11/102* (2014.01)
*C09D 11/322* (2014.01)
*C09D 11/38* (2014.01)

(52) U.S. Cl.
CPC ........... *B41J 2/2117* (2013.01); *C09D 11/102* (2013.01); *C09D 11/322* (2013.01); *C09D 11/38* (2013.01)

(58) Field of Classification Search
CPC .............. B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 25/001; B41J 25/34; B41J 25/003; B41J 2/18; B41J 25/312; B41J 2025/008; B41J 2202/21; B41J 2/17596; B41J 2/16508; B41J 2/1652; B41J 2/175; B41J 2/17563; B41M 5/0011; B41M 5/0017; B41M 5/0023; B41M 5/0047; B41M 7/00; B41M 7/0072; B41M 5/52; B41M 5/5218; B41M 5/5227
See application file for complete search history.

(56) References Cited

U.S. PATENT DOCUMENTS

| | | | | |
|---|---|---|---|---|
| 2009/0155560 | A1* | 6/2009 | Lefebvre ................ | D21H 21/14<br>428/218 |
| 2012/0147085 | A1* | 6/2012 | Hirata ...................... | D06Q 1/04<br>347/20 |
| 2012/0223992 | A1* | 9/2012 | Hirata .................... | B41J 2/2114<br>347/14 |
| 2012/0293578 | A1* | 11/2012 | Shiono ................... | C09D 11/54<br>524/502 |
| 2013/0135382 | A1* | 5/2013 | Mitsuzawa .......... | C09D 133/08<br>524/565 |
| 2015/0284660 | A1* | 10/2015 | Budijono ............... | A61Q 15/00<br>510/106 |
| 2020/0095733 | A1* | 3/2020 | Weisman ............. | C11D 17/044 |
| 2021/0086525 | A1* | 3/2021 | Popplewell ........... | F26B 17/023 |
| 2021/0129568 | A1* | 5/2021 | Miyasa ................ | B41M 5/0023 |

* cited by examiner

FIG. 1

TABLE 1

| | PREPARATION EXAMPLE | | | | | | | | | | | | | | |
|---|---|---|---|---|---|---|---|---|---|---|---|---|---|---|---|
| | A1 | A2 | A3 | A4 | A5 | A6 | A7 | A8 | A9 | A10 | A11 | A12 | A13 | A14 | A15 |
| MICROCAPSULE 1 | 1.00 | – | – | – | – | 5.00 | 1.00 | 1.00 | 1.00 | 1.00 | – | – | – | – | – |
| MICROCAPSULE 2 | – | 1.00 | – | – | – | – | – | – | – | – | – | – | – | – | – |
| MICROCAPSULE 3 | – | – | 1.00 | – | – | – | – | – | – | – | – | – | – | – | – |
| MICROCAPSULE 4 | – | – | – | 1.00 | – | – | – | – | – | – | – | – | – | – | – |
| NON-MICROCAPSULIZED FRAGRANCE | – | – | – | – | 1.00 | – | – | – | – | – | – | – | – | – | – |
| MICROCAPSULE 5 | – | – | – | – | – | – | – | – | – | – | 1.00 | – | – | – | – |
| MICROCAPSULE 6 | – | – | – | – | – | – | – | – | – | – | – | 1.00 | – | – | – |
| MICROCAPSULE 7 | – | – | – | – | – | – | – | – | – | – | – | – | 1.00 | – | – |
| MICROCAPSULE 8 | – | – | – | – | – | – | – | – | – | – | – | – | – | 1.00 | – |
| MICROCAPSULE 9 | – | – | – | – | – | – | – | – | – | – | – | – | – | – | 1.00 |
| PROPYLENE GLYCOL | 20.00 | 20.00 | 20.00 | 20.00 | 20.00 | 20.00 | 50.00 | – | 20.00 | 20.00 | 20.00 | 20.00 | 20.00 | 20.00 | 20.00 |
| SAG503A | 0.25 | 0.25 | 0.25 | 0.25 | 0.25 | 0.25 | 0.25 | 0.25 | – | 0.25 | 0.25 | 0.25 | 0.25 | 0.25 | 0.25 |
| POLYURETHANE RESIN | – | – | – | – | – | – | – | – | – | 10.00 | – | – | – | – | – |
| PURE WATER | 78.75 | 78.75 | 78.75 | 78.75 | 78.75 | 74.75 | 48.75 | 98.75 | 79.00 | 68.75 | 78.75 | 78.75 | 78.75 | 78.75 | 78.75 |
| INK VISCOSITY (mPa·s) | 4.5 | 4.3 | 4.6 | 5.2 | 4.5 | 6.2 | 25.1 | 3.2 | 4.4 | 5.5 | 4.4 | 10.1 | 9.5 | 5.6 | 4.2 |

FIG. 2

TABLE 2

| | PREPARATION EXAMPLE | | |
|---|---|---|---|
| | B1 | B2 | B3 |
| PB15:3 | 10.00 | — | — |
| $TiO_2$ | — | 10.00 | — |
| DB87 | — | — | 10.00 |
| RESIN PARTICLES | 10.00 | 10.00 | 10.00 |
| GLYCERIN | 15.00 | 15.00 | 15.00 |
| PROPYLENE GLYCOL | 5.00 | 5.00 | 5.00 |
| SAG503A | 0.25 | 0.25 | 0.25 |
| PURE WATER | 59.75 | 59.75 | 59.75 |

FIG. 3

TABLE 3

| | | EXAMPLE | | | | | | | | | | | | | | |
|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 |
| FRAGRANT INK (PREPARATION EXAMPLE NO.) | | A1 | A1 | A1 | A2 | A1 | A2 | A1+A3 | A4 | A6 | A7 | A8 | A9 | A1 | A11 | A13 |
| COLOR INK (PREPARATION EXAMPLE NO.) | | B1 | B1 | B1 | B1 | B1+B2 | B1+B2 | B1 | B1 | B1 | B1 | B1 | B1 | B3 | B1 | B1 |
| PRINTING METHOD | | SIMULTANEOUS PRINTING | DUAL HEAD PRINTING | NOZZLE DIVISION PRINTING | SIMULTANEOUS PRINTING | SIMULTANEOUS PRINTING | SIMULTANEOUS PRINTING | SIMULTANEOUS PRINTING | SIMULTANEOUS PRINTING | SIMULTANEOUS PRINTING | SIMULTANEOUS PRINTING | SIMULTANEOUS PRINTING | SIMULTANEOUS PRINTING | SIMULTANEOUS PRINTING | SIMULTANEOUS PRINTING | SIMULTANEOUS PRINTING |
| EJECTION STABILITY | | AA | AA | AA | AA | AA | AA | AA | A | A | A | AA | A | AA | AA | AA |
| CLOGGING RECOVERY PROPERTY | | A | A | A | A | A | A | A | B | A | B | B | A | A | A | A |
| DURABILITY OF SMELL | EVALUATION WITH TIME | B | B | B | A | A | A | A | A | A | B | B | B | B | B | B |
| | DRY FRICTION RESISTANCE | A | A | A | A | A | A | A | A | A | A | A | A | B | A | A |
| | WET FRICTION RESISTANCE | A | A | A | A | A | A | A | A | A | A | A | A | A | A | B |
| | WASHING FASTNESS | A | A | A | B | A | B | A | A | A | A | A | A | B | A | B |

FIG. 4

TABLE 4

| | | EXAMPLE 16 | EXAMPLE 17 | EXAMPLE 18 | EXAMPLE 19 | COMPARATIVE EXAMPLE 1 |
|---|---|---|---|---|---|---|
| FRAGRANT INK (PREPARATION EXAMPLE NO.) | | A12 | A14 | A15 | A10 | A5 |
| COLOR INK (PREPARATION EXAMPLE NO.) | | B1 | B1 | B1 | B1 | B1 |
| PRINTING METHOD | | SIMULTANEOUS PRINTING | SIMULTANEOUS PRINTING | SIMULTANEOUS PRINTING | SIMULTANEOUS PRINTING | SIMULTANEOUS PRINTING |
| EJECTION STABILITY | | B | AA | AA | B | AA |
| CLOGGING RECOVERY PROPERTY | | B | A | B | A | A |
| DURABILITY OF SMELL | EVALUATION WITH TIME | B | B | B | A | C |
| | DRY FRICTION RESISTANCE | A | B | B | A | C |
| | WET FRICTION RESISTANCE | A | B | B | A | C |
| | WASHING FASTNESS | A | B | C | A | C |

RECORDING METHOD AND INK SET

The present application is based on, and claims priority from JP Application Serial Number 2023-132833, filed Aug. 17, 2023, the disclosure of which is hereby incorporated by reference herein in its entirety.

BACKGROUND

1. Technical Field

The present disclosure relates to a recording method and an ink set.

2. Related Art

Unlike recording by a related printing method, recording by an ink jet method is not required to use a printing plate and is advantageous in terms of on-demand characteristics and the like; hence, the recording by an ink jet method described above has been widely used in various types of fields.

As the recording by an ink jet method has been widely used in various types of fields, for example, needs to impart special properties, such as generation of smell, to recorded matters have arisen.

From the situation as described above, an ink jet printer ink containing a fragrance besides a pigment has been proposed (for example, see JP-A-2002-338863).

However, when a fragrance is directly added to an ink jet ink, the fragrance is evaporated at the same time when the ink jet ink applied onto a recording medium is dried, and as a result, problems such that the aroma generated from a manufactured recorded matter is weakened and/or the period of time for the recorded matter to obtain an aroma effect is seriously shortened may occur in some cases.

In addition, the case in which a fragrance enclosed in microcapsules is contained in an ink jet ink may also be considered; however, even in the case as described above, the durability of the smell cannot be made sufficient, and in particular, for example, when the recorded matter is rubbed and/or washed, a problem in that the aroma is significantly decreased within a short period of time may occur in some cases.

The present disclosure was made to solve the problems described above and can be realized in accordance with the following aspects.

SUMMARY

According to an aspect of the present disclosure, there is provided a recording method comprising a fragrant ink adhesion step in which a fragrant ink containing microcapsules which enclose a fragrance is ejected by an ink jet method and is adhered to a recording medium and a color ink adhesion step in which a color ink containing a colorant, resin particles, and water is ejected by an ink jet method and is adhered to the recording medium. In the recording method described above, the fragrant ink and the color ink are adhered to the recording medium so as to be at least partially overlapped with each other thereon.

According to another aspect of the present disclosure, there is provided an ink set which includes at least two types of inks to be ejected by an ink jet method, the ink set comprising a fragrant ink containing microcapsules which enclose a fragrance and a color ink containing a colorant, resin particles, and water.

BRIEF DESCRIPTION OF THE DRAWINGS

FIG. 1 is a table collectively showing conditions of fragrant inks prepared in Preparation Examples A1 to A15.

FIG. 2 is a table collectively showing conditions of color inks prepared in Preparation Examples B1 to B3.

FIG. 3 is a table collectively showing evaluation results besides types of inks forming ink sets and printing methods of Examples 1 to 15.

FIG. 4 is a table collectively showing evaluation results besides types of inks forming ink sets and printing methods of Examples 16 to 19 and Comparative Example 1.

DESCRIPTION OF EMBODIMENTS

Hereinafter, preferable embodiments of the present disclosure will be described in detail.

1 Ink Set

First of all, an ink set of the present disclosure will be described.

The ink set of the present disclosure is an ink set including at least two types of inks to be ejected by an ink jet method and includes a fragrant ink containing microcapsules which enclose a fragrance and a color ink containing a colorant, resin particles, and water.

Accordingly, an ink set which can be used to stably manufacture a recorded matter having an excellent durability of smell can be provided. In particular, even when the recorded matter is rubbed and/or washed, the aroma can be prevented from being seriously decreased within a short period of time. In addition, a storage stability of an ink to be used to manufacture a recorded matter can be made excellent.

The reason those excellent effects can be obtained is believed as described below. That is, since the fragrance is enclosed in the microcapsules, and in addition to that, since the resin particles are used, the microcapsules are prevented from falling from a recording medium, the fragrance enclosed in the microcapsules can be preferably held on the recording medium, and the smell can be stably maintained for a long period of time. In particular, even when the recorded matter is rubbed and/or washed, the aroma can be prevented from being seriously decreased within a short period of time. In addition, since the resin particles are contained not in the fragrant ink but in the color ink, that is, before the recorded matter is manufactured, since the microcapsules are separated from the resin particles, when the inks used to manufacture the recorded matter are stored, for example, unfavorable aggregation of the microcapsules can be preferably prevented. Accordingly, the storage stability of the ink and an ejection stability thereof by an ink jet method can be made excellent, and the manufacturing of the recorded matter can be stably performed for a long period of time.

In addition, since the ink containing a fragrance and the ink containing a colorant are both prepared, when the ejection amounts of the respective inks are adjusted, for example, the degree of smell can be preferably adjusted.

The ink set of the present disclosure is preferably used for a recording method which will be described later in detail.

1-1 Ink Jet Method

The fragrant ink and the color ink forming the ink set of the present disclosure are to be ejected by an ink jet method.

Since the inks described above are to be ejected by an ink jet method, for example, even when a recorded portion to be formed by the fragrant ink and a recorded portion to be formed by the color ink each have a fine pattern, the recorded portions described above can be preferably formed. In addition, a recorded portion can also be preferably formed on a curved surface area and the like. In addition, the ink jet method is excellent in on-demand characteristics, and recorded portions having various types of patterns can be preferably formed. In addition, since the inks can be prevented from being wastefully used, the ink jet method is also preferable, for example, in view of resource saving.

As the ink jet method, for example, there may be mentioned a charge deflection method, a continuous method, or an on-demand method, such as a piezoelectric method or a bubble jet (registered trademark) method.

1-2 Fragrant Ink

Hereinafter, the fragrant ink forming the ink set of the present disclosure will be described.

1-2-1 Microcapsule

The fragrant ink is an ink containing microcapsules which at least enclose a fragrance.

In addition, instead of the microcapsules which enclose a fragrance, when a fragrance which is not covered with a shell material is contained, the fragrance is evaporated at the same time when the ink jet ink applied onto a recording medium is dried, and as a result, problems such that the aroma generated from a manufactured recorded matter is weakened and/or the period of time for the recorded matter to obtain an aroma effect is seriously decreased may arise in some cases.

1-2-1-1 Fragrance

The microcapsule contained in the fragrant ink at least encloses a fragrance.

As the fragrance, for example, various types of natural fragrances and synthetic fragrances may be used.

As the fragrances as described above, for example, there may be mentioned a chain organic compound, such as an alcohol, an aldehyde, or a ketone; an alicyclic compound, such as an alcohol, an aldehyde, a ketone, an ester, an ether, or a hydrocarbon; a terpene compound, such as an alcohol, an aldehyde, a ketone, an ester, or an ether; or an aromatic compound, such as an alcohol, an aldehyde, a ketone, or an ether.

As the chain organic compound, such as an alcohol, an aldehyde, or a ketone, for example, there may be mentioned an alcohol having 6 to 12 carbon atoms, cis-3-hexenol, 3,3,5-trimethylhexanol, an aldehyde having 6 to 12 carbon atoms, or methyl amyl ketone.

As the alicyclic compound, such as an alcohol, an aldehyde, a ketone, an ester, an ether, or a hydrocarbon, for example, there may be mentioned p-t-butylcyclohexanol, o-t-butylcyclohexanol, a synthetic sandalwood, 4-(tricycle [5,2,1,02,6]-decylidene-8)-butanal, 2,4-dimethylcyclohex-3-ene-3-carbaldehyde, p-t-butylcyclohexylacetate, o-t-butylcyclohexylacetate, tricycle[5,2,1,02,6]-dec-3-ene-8 (or 9)-yl acetate, 4-acetoxy-3-pentyltetrahydropyrane, ethylene brassylate, o-t-butylcyclohexanone, p-t-amylcyclohexanone, or 2-ethyl hexanal ethylene glycol acetal.

As the terpene compound, such as an alcohol, an aldehyde, a ketone, an ester, or an ether, for example, there may be mentioned menthol, linalool, terpineol, citronellol, geraniol, borneol, cedrol, lavandulol, 2,6-dimethyl-heptane-2-ol, citral, citronellal, methoxycitronellal, hydroxycitronellal, geranoxyacetaldehyde, 4-(4-methyl-3-pentenyl)-cyclohex-3-ene-1-carbaldehyde, 2,4,6-trimethylcyclohex-3-ene-1-carbaldehyde, iso-bornyl acetate, ionone, methylionone, acetyl cedrene, 2,2,7,7-tetramethyl-2-tricyclo[6,2,1,03,8]-undecane-4-one, camphor, menthone, d-limonene, 1-limonene, p-cymene, β-caryophyllene, rose oxide, linalool oxide, decahydro-3a, 6,6,9a-tetramethylnaphtho-[2,1-b]-furan, or 4-methylene-1-oxaspiro-[5,5]-undecane.

As the aromatic compound, such as an alcohol, an aldehyde, a ketone, or an ether, for example, there may be mentioned phenylethyl alcohol, anise alcohol, phenylethyl dimethyl carbinol, eugenol, iso-eugenol, cinnamic alcohol, hexyl cinnamic aldehyde, p-tert-butyl-2-methylhydrocinnamic aldehyde, anisaldehyde, cuminaldehyde, phenoxyacetaldehyde, heliotropine, vanillin, p-ethyl-2,2-dimethylhydrocinnamic aldehyde, benzophenone, p-methoxyacetophenone, β-methyl naphthyl ketone, aurantiol, phenylacetaldehyde, dimethyl acetal, a nitro musk, coumarin, an isochroman-based musk, methyl anthranilate, iso-butylquinoline, p-cresyl methyl ether, methyl eugenol, or anethole.

Those fragrances may be used alone, or at least two types thereof may be used in combination.

A content of the fragrance in the microcapsule is preferably 1 to 60 percent by mass and more preferably 10 to 55 percent by mass.

Accordingly, in a recorded matter to be manufactured, the aroma can be sufficiently obtained, and at the same time, adhesion of the microcapsules to a recording medium can also be made more excellent.

1-2-1-2 Shell Material

The fragrances described above are each enclosed by a shell material in the microcapsule.

As the shell material, for example, various types of resin materials may be used.

As the resin material forming the shell material, for example, an urethane resin, a melamine resin, a styrene resin, an acrylic resin, or a vinyl-chloride resin may be mentioned, and those mentioned above may be used alone, or at least two types selected therefrom may be used in combination.

In particular, the microcapsule is preferably formed from a material containing at least one selected from the group consisting of an urethane resin and a melamine resin and is more preferably formed from a material containing a melamine resin.

Accordingly, the durability of the smell of a recorded matter to be manufactured using the ink set of the present disclosure can be made more excellent. In addition, a dispersion stability of the microcapsules in the fragrant ink and the ejection stability of the fragrant ink by an ink jet method can also be made more excellent.

The microcapsule has a shell thickness of preferably 0.3 μm or less, more preferably 3 nm to 0.2 μm, and further preferably 5 nm to 0.1 μm.

Accordingly, for example, when the fragrant ink is stored, the fragrance can be preferably prevented from unfavorable diffusion and/or leakage out of the microcapsule, and in addition, for example, while the storage stability of the fragrant ink is made more excellent, in a recorded matter manufactured using the ink set of the present disclosure, the fragrance can be more preferably diffused.

1-2-1-3 Other Components

The microcapsule may contain components other than those described above. Hereinafter, in this section, the components as described above are called "other components".

As the other components, for example, an oil-soluble dye, a luminous material, a foamable material, and an antibacterial material may be mentioned, and those mentioned above may be used alone, or at least two types selected therefrom may be used in combination.

However, a content of the other components in the microcapsule is preferably 10.0 percent by mass or less, more preferably 7.0 percent by mass or less, and further preferably 5.0 percent by mass or less.

1-2-1-4 Other Conditions

The microcapsule contained in the fragrant ink preferably satisfies the following conditions.

For example, the microcapsules have an average particle diameter of preferably 10 nm to 10 μm, more preferably 15 nm to 5 μm, and further preferably 20 nm to 1 μm.

Accordingly, while the content of the fragrance in the microcapsule is made sufficiently high, the ejection stability of the fragrant ink by an ink jet method can be made more excellent.

In addition, in this specification, unless otherwise particularly noted, the average particle diameter indicates, in the particle distribution measured by a light scattering method, a particle diameter at a cumulative volume frequency of 50% calculated from a small particle diameter side and can be obtained, for example, by the measurement using a zeta potential/particle diameter measurement system "ELSZ-1000ZS" (manufactured by Otsuka Electronics Co. Ltd.).

In addition, a content of the microcapsules in the fragrant ink is preferably 0.1 to 10.0 percent by mass, more preferably 0.2 to 7.0 percent by mass, and further preferably 0.3 to 3.0 percent by mass.

Accordingly, in a recorded matter to be manufactured, while the intensity of the aroma and the durability of the smell can be made sufficient, the ejection stability of the fragrant ink by an ink jet method can be made more excellent.

1-2-2 Water

In general, the fragrant ink contains water as a dispersant to disperse the microcapsules described above.

Accordingly, in the fragrant ink, the microcapsules can be placed in a preferable dispersion state, and the ejection by an ink jet method can be preferably performed.

A content of the water in the fragrant ink is preferably 55.0 to 94.0 percent by mass, more preferably 60.0 to 92.0 percent by mass, and further preferably 70.0 to 90.0 percent by mass.

Accordingly, the storage stability of the fragrant ink and the ejection stability thereof by an ink jet method can be made more excellent.

1-2-3 Moisturizer

The fragrant ink may be an ink containing a moisturizer.

Accordingly, for example, the fragrant ink can be effectively suppressed from being unfavorably dried at an ink jet head or the like, and the ejection stability of the fragrant ink by an ink jet method can be made more excellent.

As the moisturizer, for example, a polyol compound, a glycol ether, or a betaine compound may be mentioned.

As the polyol compound, for example, a polyol compound which has 2 to 6 carbon atoms and which may include an ether bond may be mentioned. As a concrete example, for example, there may be mentioned ethylene glycol, propylene glycol, 1,2-pentanediol, triethylene glycol, triethylene glycol monomethyl ether, triethylene glycol monobutyl ether, trimethylolpropane, diethylene glycol monobutyl ether, dipropylene glycol monopropyl ether, glycerin, 1,2-hexanediol, 1,2-heptanediol, 1,3-propanediol, 1,2-butanediol, 1,3-butanediol, 1,4-butanediol, 2,3-butanediol, 2-methyl-3-phenoxy-1,2-propanediol, 3-(3-methylphenoxy)-1,2-propanediol, 3-hexyloxy-1,2-propanediol, 2-hydroxymethyl-2-phenoxymethyl-1,3-propanediol, 3-methyl-1,3-butanediol, 1,5-pentanediol, 1,6-hexanediol, 2-methyl-2,4-pentanediol, or 3-methyl-1,5-pentanediol.

As the glycol ether, for example, a monoalkyl ether of a glycol selected from ethylene glycol, diethylene glycol, triethylene glycol, a polyethylene glycol, propylene glycol, dipropylene glycol, tripropylene glycol, a polypropylene glycol, and a polyoxyethylene polyoxypropylene glycol is preferable. In addition, triethylene glycol monomethyl ether, triethylene glycol monobutyl ether, or dipropylene glycol monopropyl ether may be more preferably mentioned.

The betaine compound is a compound in which a positive charge and a negative charge are present in the same molecule at positions not adjacent to each other, a dissociable hydrogen atom is not bonded to the atom having a positive charge, and no charge is present as the whole molecule. As a preferable betaine compound, an N-alkyl substituted amino acid may be mentioned, and an N-trialkyl substituted amino acid is more preferable. As the betaine compound, for example, there may be mentioned trimethylglycine, γ-butyrobetaine, homarine, trigonelline, carnitine, homoserine betaine, valine betaine, lysine betaine, ornithine betaine, alanine betaine, stachydrine, or glutamic acid betaine, and for example, trimethylglycine may be preferably mentioned.

Among those mentioned above, as the moisturizer, the fragrant ink preferably contains at least one selected from the group consisting of glycerin, propylene glycol, and a glycol ether.

Accordingly, the effect described above can be more significantly obtained.

A content of the moisturizer in the fragrant ink is preferably 5.0 to 35.0 percent by mass, more preferably 7.0 to 30.0 percent by mass, and further preferably 10.0 to 27.0 percent by mass.

Accordingly, while the fragrant ink is preferably suppressed from being excessively increased in viscosity, a more preferable moisturizing effect can be obtained, and in addition, the ejection stability of the fragrant ink by an ink jet method can be made further excellent.

In particular, when the color ink contains a pigment as the colorant, and when the recording medium is formed of a cloth, a total content of glycerin, propylene glycol, and a glycol ether in the fragrant ink is preferably 3.0 to 30.0 percent by mass, more preferably 5.0 to 25.0 percent by mass, and further preferably 8.0 to 23.0 percent by mass.

Accordingly, the moisturizing effect can be more effectively obtained, and the ejection stability can be further improved.

1-2-4 Surfactant

The fragrant ink may be an ink containing a surfactant.

Accordingly, for example, permeability of the fragrant ink to a permeable recording medium is improved, and the fragrance can be more preferably permeated in the recording medium. As a result, the durability of the smell of a recorded matter to be manufactured can be made more preferable. The effect as described above can be more significantly obtained when the recording medium is formed of a cloth.

As the surfactant, for example, an acetylene glycol-based surfactant, an acetylene alcohol-based surfactant, or a polysiloxane-based surfactant may be mentioned, and although those mentioned above may be used alone, or at least two types selected therefrom may be used in combination, in particular, an acetylene-based surfactant is preferable.

Accordingly, the effect described above can be more significantly obtained.

Although the acetylene glycol-based surfactant and the acetylene alcohol-based surfactant mentioned above are not particularly limited, for example, there may be mentioned 2,4,7,9-tetramethyl-5-decyne-4,7-diol, an alkylene oxide adduct thereof, 2,4-dimethyl-5-decyne-4-ol, and an alkylene oxide adduct thereof. Those described above can be available as commercial products, such as Olfine 104 series or E series, such as Olfine E1010 (trade name, manufactured by Air Products & Chemicals Inc.), or Surfynol 465 or Surfynol 61 (trade name, manufactured by Nissin Chemical Industry Co., Ltd.).

In addition, although the polysiloxane-based surfactant is not particularly limited, for example, BYK-347 or BYK-348 (trade name, manufactured by BYK Japan KK) may be mentioned.

A content of the surfactant in the fragrant ink is preferably 0.05 to 0.50 percent by mass, more preferably 0.07 to 0.45 percent by mass, and further preferably 0.10 to 0.40 percent by mass.

Accordingly, the effect described above can be more significantly obtained.

1-2-5 Other Components

The fragrant ink may also contain components other than those described above. Hereinafter, in this section, the components as described above are called "other components".

As the other components described above, for example, there may be mentioned a pH adjuster, an antiseptic/fungicide agent, a dispersant, a chelating agent, an antirust, an antioxidant, an UV absorber, an oxygen absorber, and the like, and the other components described above may be used alone, or at least two types selected therefrom may be used in combination.

As the pH adjuster, for example, there may be mentioned potassium dihydrogen phosphate, disodium hydrogen phosphate, sodium hydroxide, lithium hydroxide, potassium hydroxide, ammonia, diethanolamine, triethanolamine, triisopropanolamine, potassium carbonate, sodium carbonate, or sodium hydrogen carbonate, and those mentioned above may be used alone, or at least two types selected therefrom may be used in combination.

As the antiseptic/fungicide agent, for example, there may be mentioned sodium benzoate, sodium pentachlorophenolate, sodium 2-pyridienthiol-1-oxide, sodium sorbate, sodium dehydroacetate, or 1,2-dibenzothiazoline-3-one, and those mentioned above may be used alone, or at least two types selected therefrom may be used in combination.

However, a content of the other components in the fragrant ink is preferably 10.0 percent by mass or less, more preferably 7.0 percent by mass or less, and further preferably 5.0 percent by mass or less.

In particular, the fragrant ink preferably substantially contains no resin particles which will be described later as a constituent component of the color ink. In more particular, a content of the resin particles in the fragrant ink is preferably 0.1 percent by mass or less, more preferably 0.03 percent by mass or less, and further preferably 0.01 percent by mass or less.

Accordingly, the microcapsules in the fragrant ink can be more effectively prevented from being unfavorably aggregated, and the storage stability of the fragrant ink and the ejection stability thereof by an ink jet method can be made more excellent. As a result, the manufacturing of recorded matters can be more stably performed over a long period of time.

1-2-6 Other Conditions

The fragrant ink preferably satisfies the following conditions.

For example, the fragrant ink has a viscosity of preferably 2 to 20 mPa·s, more preferably 3 to 15 mPa·s, and further preferably 4 to 10 mPa·s.

Accordingly, the ejection stability of the fragrant ink by an ink jet method can be made more excellent.

In addition, the viscosity can be measured at 25° C. in a manner such that the viscosity is read at a shearing rate of 10 [$s^{-1}$] using a viscoelastic tester (such as VISCO 6800, manufactured by Atago Co., Ltd.).

In addition, although the ink set of the present disclosure may include at least one type of fragrant ink, at least two types of fragrant inks may also be included.

Accordingly, for example, in a recorded matter to be manufactured using the ink set of the present disclosure, a more complicated smell may be realized, and in addition, different smells may also be realized at respective portions of the recorded matter.

1-3 Color Ink

Next, the color ink forming the ink set of the present disclosure will be described.

1-3-1 Colorant

The color ink contains a colorant.

Accordingly, in a recorded matter to be manufactured, a colored portion colored by the ink can be formed.

As the colorant, for example, various types of pigments, such as organic pigments and inorganic pigments, and various types of dyes may be mentioned, and those described above may be used alone, or at least two types selected therefrom may be used in combination.

As the organic pigment, for example, there may be mentioned an azo pigment, such as an azo lake, an insoluble azo pigment, a condensed azo pigment, or a chelating azo pigment; a polycyclic pigment, such as a phthalocyanine pigment, a perylene pigment, a perinone pigment, an anthraquinone pigment, a quinacridone pigment, a dioxazine pigment, a thioindigo pigment, an isoindolinone pigment, or a quinophthalone pigment; a dye lake (such as a basic dye lake or an acidic dye lake), a nitro pigment, a nitroso pigment, an aniline black, or a daylight fluorescent pigment.

As the inorganic pigment, for example, a titanium oxide, an iron oxide, or a carbon black may be mentioned. As the carbon black, for example, a carbon black manufactured by a known method, such as a contact method, a furnace method, or a thermal method, may be used.

In addition, as the pigment, a self-dispersible type surface treated pigment in which hydrophilic groups are introduced on pigment particle surfaces, that is, a so-called self dispersible pigment, may be used.

As the dye, for example, a sublimation dye, an oil dye, a disperse dye, a fluorescent dye, a reactive dye, an acid dye, a sulfur dye, a vat dye, or a cationic dye may be mentioned.

As the disperse dye and the sublimation dye, for example, there may be mentioned C.I. Disperse Yellow 1, 3, 4, 5, 7, 9, 13, 23, 24, 30, 33, 34, 42, 44, 49, 50, 51, 54, 56, 58, 60, 61, 63, 64, 66, 68, 71, 74, 76, 79, 82, 83, 85, 86, 88, 90, 91, 93, 98, 99, 100, 104, 108, 114, 116, 118, 119, 122, 124, 126, 135, 140, 141, 149, 154, 160, 162, 163, 164, 165, 179, 180, 182, 183, 184, 186, 192, 198, 199, 201, 202, 204, 210, 211, 215, 216, 218, 224, 227, 231, or 232; C.I. Disperse Orange 1, 3, 5, 7, 11, 13, 17, 20, 21, 25, 29, 30, 31, 32, 33, 37, 38, 42, 43, 44, 45, 46, 47, 48, 49, 50, 53, 54, 55, 56, 57, 58, 59, 60, 61, 66, 71, 73, 76, 78, 80, 89, 90, 91, 93, 96, 97, 119, 127, 130, 139, or 142; C.I. Disperse Red 1, 4, 5, 7, 11, 12, 13, 15, 17, 27, 43, 44, 50, 52, 53, 54, 55, 56, 58, 59, 60, 65, 72, 73, 74, 75, 76, 78, 81, 82, 86, 88, 90, 91, 92, 93, 96, 103, 105, 106, 107, 108, 110, 111, 113, 117, 118, 121, 122, 126, 127, 128, 131, 132, 134, 135, 137, 143, 145, 146, 151, 152, 153, 154, 157, 159, 164, 167, 169, 177, 179, 181, 183, 184, 185, 188, 189, 190, 191, 192, 200, 201, 202, 203, 205, 206, 207, 210, 221, 224, 225, 227, 229, 239, 240, 257, 258, 277, 278, 279, 281, 288, 298, 302, 303, 310, 311, 312, 320, 324, 328, or 364; C.I. Disperse Violet 1, 4, 8, 23, 26, 27, 28, 31, 33, 35, 36, 38, 40, 43, 46, 48, 50, 51, 52, 56, 57, 59, 61, 63, 69, or 77; C.I. Disperse Green 9; C.I. Disperse Brown 1, 2, 4, 9, 13, or 19; C.I. Disperse Blue 3, 7, 9, 14, 16, 19, 20, 24, 26, 27, 35, 43, 44, 54, 55, 56, 58, 60, 62, 64, 71, 72, 73, 75, 79, 81, 82, 83, 87, 91, 92, 93, 94, 95, 96, 102, 106, 108, 112, 113, 115, 118, 120, 122, 125, 128, 130, 139, 141, 142, 143, 146, 148, 149, 153, 154, 158, 165, 167, 171, 173, 174, 176, 181, 183, 185, 186, 187, 189, 197, 198, 200, 201, 205, 207, 211, 214, 224, 225, 257, 259, 267, 268, 270, 284, 285, 287, 288, 291, 293, 295, 297, 301, 315, 330, 333, 359, or 360; or C.I. Disperse Black 1, 3, 10, or 24.

As the oil dye, for example, there may be mentioned C.I. Solvent Black 3, 7, 27, 29, or 34; C.I. Solvent Yellow 14, 16, 19, 29, 56, or 82; C.I. Solvent Red 1, 3, 8, 18, 24, 27, 43, 51, 72, 73, 132, or 218; C.I. Solvent Violet 3; C.I. Solvent Blue 2, 5, 11, or 70; C.I. Solvent Green 3 or 7; or C.I. Solvent Orange 2.

In addition, as the fluorescent dye, for example, there may be mentioned C.I. Disperse Red 362 or 364; C.I. Vat Red 41; or C.I. Disperse Yellow 43, 82, 184, or 232.

As the reactive dye, for example, there may be mentioned a yellow dye, such as C.I. Reactive Yellow 2, 3, 18, 81, 84, 85, 95, 99, or 102; an orange dye, such as C.I. Reactive Orange 5, 9, 12, 13, 35, 45, or 99; a brown dye, such as C.I. Reactive Brown 2, 8, 9, 17, or 33; a red dye, such as C.I. Reactive Red 1, 3, 4, 13, 15, 24, 29, 31, 33, 120, 125, 151, 206, 218, 226, or 245; a violet dye, such as C.I. Reactive Violet 24; a blue dye, such as C.I. Reactive Blue 2, 4, 5, 10, 13, 14, 15, 15:1, 19, 21, 49, 63, 71, 72, 75, 162, 176, or 198; a green dye, such as C.I. Reactive Green 5, 8, or 19; or a black dye, such as C.I. Reactive Black 1, 8, 23, or 39.

In particular, as the colorant, the pigment is preferable.

Accordingly, a color development property of a recorded portion formed using the color ink can be made more excellent. In addition, since the color ink contains the pigment together with the resin particles, compared to the case in which no resin particles are contained, an effect to improve the storage stability and the ejection stability of the color ink can be more significantly obtained. In addition, when the microcapsules and the pigment are contained in the same ink, aggregates are liable to be generated in this ink by the microcapsules and the pigment, and as a result, the storage stability and the ejection stability of the ink are seriously degraded; however, in the present disclosure in which the microcapsules and the colorant are separately contained in the different inks, the problem as described above can be effectively prevented from being generated. Accordingly, when the color ink contains the pigment as the colorant, the effects of the present disclosure can be more significantly obtained.

Although a content of the colorant in the color ink is not particularly limited, the content described above is preferably 1.0 to 20.0 percent by mass, more preferably 2.0 to 15.0 percent by mass, and further preferably 3.0 to 12.0 percent by mass.

Accordingly, the color development property of a recorded portion to be formed using the color ink can be made more excellent. In addition, for example, unfavorable color unevenness can be more effectively prevented from being generated in a recorded matter to be manufactured using the color ink. The effects of the present disclosure as described above can be further significantly obtained.

1-3-2 Resin Particles

The color ink contains resin particles.

Accordingly, the adhesion of the microcapsules in a recorded matter to be manufactured to a recording medium can be made more excellent. Hence, the durability of the smell of the recorded matter can be made more excellent.

As a resin material forming the resin particles, for example, a polyurethane resin, a styrene resin, an acrylic resin, a vinyl chloride resin, or a polyethylene may be mentioned. Those resins mentioned above may be used alone, or at least two types selected therefrom may be used in combination, and in particular, a polyurethane resin is preferable.

Accordingly, the adhesion of the microcapsules in a recorded matter to be manufactured to a recording medium can be made further excellent. In addition, the storage stability and the ejection stability of the color ink can also be made more excellent.

Although being not particularly limited, the average particle diameter of the resin particles is preferably 0.01 to 1.0 μm and more preferably 0.1 to 0.3 μm.

Accordingly, while the adhesion of the microcapsules in a recorded matter to be manufactured to a recording medium can be made further excellent, the storage stability and the ejection stability of the color ink can also be made more excellent.

Although a content of the resin particles in the color ink is not particularly limited, the content described above is preferably 1.0 to 20.0 percent by mass, more preferably 3.0 to 17.0 percent by mass, and further preferably 5.0 to 15.0 percent by mass.

Accordingly, while the adhesion of the microcapsules in a recorded matter to be manufactured to a recording medium can be made further excellent, the storage stability and the ejection stability of the color ink can be made more excellent.

When the content of the colorant in the color ink is represented by XA [percent by mass], and the content of the resin particles in the color ink is represented by XB [percent by mass], $0.05 \leq XB/XA \leq 20.0$ is preferably satisfied, $0.20 \leq XB/XA \leq 8.5$ is more preferably satisfied, and $0.42 \leq XB/XA \leq 5.0$ is further preferably satisfied.

Accordingly, while the adhesion of the microcapsules in a recorded matter to be manufactured to a recording medium can be made further excellent, the storage stability and the ejection stability of the color ink can be made further excellent.

1-3-3 Water

The color ink contains water.

Accordingly, in the color ink, the colorant can be preferably dissolved or dispersed, and the color ink can be preferably ejected by an ink jet method.

A content of the water in the color ink is preferably 40.0 to 90.0 percent by mass, more preferably 50.0 to 85.0 percent by mass, and further preferably 55.0 to 80.0 percent by mass.

Accordingly, the storage stability of the color ink and the ejection stability thereof by an ink jet method can be made more excellent.

1-3-4 Moisturizer

The color ink may be an ink containing a moisturizer.

Accordingly, for example, the color ink can be effectively suppressed from being unfavorably dried at an ink jet head or the like, and the ejection stability of the color ink by an ink jet method can be made more excellent.

As the moisturizer, for example, the moisturizers described by way of example in the above "1-2-3" may be mentioned.

In particular, the color ink preferably contains as the moisturizer, at least one selected from the group consisting of glycerin, propylene glycol, and a glycol ether.

Accordingly, the effect described above can be more significantly obtained.

A content of the moisturizer in the color ink is preferably 5.0 to 35.0 percent by mass, more preferably 7.0 to 30.0 percent by mass, and further preferably 10.0 to 27.0 percent by mass.

Accordingly, while the color ink is preferably suppressed from being excessively increased in viscosity, a more preferable moisturizing effect can be obtained, and the ejection stability of the color ink by an ink jet method can be made further excellent.

1-3-5 Surfactant

The color ink may be an ink containing a surfactant.

Accordingly, for example, permeability of the color ink to a permeable recording medium is improved, and adhesion of a recorded portion by the color ink to the recording medium can be made more excellent. The effect as described above can be significantly obtained when the recording medium is formed of a cloth.

As the surfactant, for example, an acetylene glycol-based surfactant, an acetylene alcohol-based surfactant, or a polysiloxane-based surfactant may be mentioned, and although those mentioned above may be used alone, or at least two types selected therefrom may be used in combination, in particular, an acetylene-based surfactant is preferable.

Accordingly, the effect described above can be more significantly obtained.

As a concrete example of the surfactant contained in the color ink, for example, the surfactants described by way of example in the above “1-2-4” may be mentioned.

A content of the surfactant in the color ink is preferably 0.05 to 0.50 percent by mass, more preferably 0.07 to 0.45 percent by mass, and further preferably 0.10 to 0.40 percent by mass.

Accordingly, the effect described above can be more significantly obtained.

1-3-6 Other Components

The color ink may also contain components other than those described above. Hereinafter, in this section, the components as described above are called “other components”.

As the other components described above, for example, there may be mentioned a pH adjuster, an antiseptic/fungicide agent, a dispersant, a chelating agent, an antirust, an antioxidant, an UV absorber, an oxygen absorber, and the like, and the other components described above may be used alone, or at least two types selected therefrom may be used in combination.

However, a content of the other components in the color ink is preferably 10.0 percent by mass or less, more preferably 7.0 percent by mass or less, and further preferably 5.0 percent by mass or less.

1-3-7 Other Conditions

The color ink preferably satisfies the following conditions.

For example, the color ink has a viscosity of preferably 2 to 20 mPa·s, more preferably 3 to 15 mPa·s, and further preferably 4 to 10 mPa·s.

Accordingly, the ejection stability of the color ink by an ink jet method can be made more excellent.

In particular, while the color ink satisfies the above viscosity conditions, the fragrant ink preferably satisfies the viscosity conditions described above.

In addition, although the ink set of the present disclosure may include at least one type of ink as the color ink, at least two types of color inks may also be included.

Accordingly, a color reproduction range can be widened.

In particular, when the ink set of the present disclosure includes at least two types of color inks, at least three color inks corresponding to the three primary colors, that is, color inks having at least three colors of cyan, magenta, and yellow, may be included.

In addition, the ink set of the present disclosure may also include an achromatic color ink.

As the achromatic color ink, for example, a black ink or a white ink may be mentioned.

In addition, the ink set of the present disclosure may include, besides at least one type of chromatic color ink, at least one type of achromatic color ink.

1-4 Others

The ink set of the present disclosure may include at least the fragrant ink and color ink described above and may further include at least one ink other than those described above.

As the ink as described above, for example, a clear ink containing no colorant nor microcapsules or an ink containing a colorant but not resin particles may be mentioned.

2 Recording Method

Next, a recording method of the present disclosure will be described.

The recording method of the present disclosure includes a fragrant ink adhesion step in which a fragrant ink containing microcapsules which enclose a fragrance is ejected by an ink jet method and is adhered to a recording medium and a color ink adhesion step in which a color ink containing a colorant, resin particles, and water is ejected by an ink jet method and is adhered to the recording medium. In addition, the fragrant ink and the color ink are adhered to the recording medium so as to be at least partially overlapped with each other thereon.

Accordingly, a recording method capable of stably manufacturing a recorded matter excellent in smell durability can be provided. In particular, even when the recorded matter is rubbed and/or washed, the aroma can be prevented from being significantly decreased in a short period of time.

In addition, since the ink containing a fragrance and the ink containing a colorant are both used, by adjusting the ejection amounts of the respective inks, for example, the degree of smell can be preferably adjusted.

In the recording method of the present disclosure, the ink set of the present disclosure described above can be preferably used.

2-1 Recording Medium

Hereinafter, a recording medium to be used for the recording method of the present disclosure will be described.

The recording medium is not particularly limited as long as the fragrant ink and the color ink are allowed to be adhered thereto, and for example, although a cloth, a film, a leather, a metal, or paper may be used, a cloth is preferable.

Accordingly, the microcapsules can be more preferably held, and the effects described above can be more significantly obtained. In addition, by friction or the like, the smell can be more preferably diffused.

As fibers forming the cloth, for example, cotton, polyester, silk, or nylon may be mentioned. In addition, as the cloth, a blended product may also be used. In addition, as the cloth, a non-woven cloth may also be used. 2-2 FRAGRANT INK ADHESION STEP In the fragrant ink adhesion step, a fragrant ink containing microcapsules which enclose a fragrance is ejected by an ink jet method and is adhered to a recording medium.

As the fragrant ink, an ink which satisfies the conditions described in the above "1-2" is preferably used. In this step, for example, solid printing may be performed in a manner such that application amounts of the fragrant ink at respective portions of the recording medium are made equivalent to each other or are made different from each other. In addition, a portion to which the fragrant ink is not applied may also be present on the recording medium.

As the ink jet method, the method described in the above "1-1" may be used.

In this step, although at least one type of fragrant ink may be used, at least two types of fragrant inks are preferably used in combination.

Accordingly, for example, different smells may be generated from different portions of the recorded matter. In addition, a more complicated smell can also be generated.

2-3 Color Ink Adhesion Step

In the color ink adhesion step, a color ink containing a colorant, resin particles, and water is ejected by an ink jet method and is adhered to a recording medium.

As the color ink, a color ink which satisfies the conditions described in the above "1-3" is preferably used.

In this step, for example, a solid printing may be performed so that application amounts of the color ink at respective portions of the recording medium are made equivalent to each other or are made different from each other. In addition, a portion to which the color ink is not applied may also be present on the recording medium.

As the ink jet method, the method described in the above "1-1" may be used.

In this step, although at least one type of color ink may be used, at least two types of color inks are preferably used in combination.

2-4 Relationship Between Fragrant Ink Adhesion Step and Color Ink Adhesion Step

The recording method of the present disclosure includes the fragrant ink adhesion step and the color ink adhesion step, and as long as the fragrant ink and the color ink are at least partially overlapped with each other on the recording medium, the order of the fragrant ink adhesion step and the color ink adhesion step is not particularly limited. For example, the color ink may be adhered in the color ink adhesion step after the fragrant ink is adhered in the fragrant ink adhesion step, the fragrant ink may be adhered in the fragrant ink adhesion step after the color ink is adhered in the color ink adhesion step, or the fragrant ink adhesion step and the color ink adhesion step may be simultaneously performed. In addition, for example, after the fragrant ink adhesion step is performed, the color ink adhesion step is performed, and thereafter, the fragrant ink adhesion step may be further performed, or after the color ink adhesion step is performed, the fragrant ink adhesion step is performed, and thereafter, the color ink adhesion step may be further performed.

The fragrant ink adhesion step and the color ink adhesion step each may be performed by a serial head method or a line head method.

When the fragrant ink adhesion step and the color ink adhesion step are performed by a serial head method, for example, after one main scanning is performed, although the other main scanning may be performed, the fragrant ink adhesion step and the color ink adhesion step are preferably performed in the same main scanning.

Accordingly, while being more preferably mixed together, the fragrant ink and the color ink can be fixed to the recording medium, and hence, the durability of the smell of a recorded matter to be manufactured can be made more preferable.

In addition, in the fragrant ink adhesion step, the main scanning is preferably performed at least two times in a manner such that the fragrant ink is adhered by a succeeding main scanning so as to be at least partially overlapped with a region to which the fragrant ink is adhered by a preceding main scanning.

Accordingly, the durability of the smell of a recorded matter to be manufactured can be made more excellent.

2-5 Other Steps

The recording method of the present disclosure may further include, besides the steps described above, for example, other steps.

For example, the recording method of the present disclosure may further include a step of adhering an ink other than the fragrant ink and the color ink described above to the recording medium.

When the step as described above is performed, this step may be performed, for example, before or after the fragrant ink adhesion step and the color ink adhesion step are performed.

In addition, the recording method of the present disclosure may also include a drying step of drying the recording medium to which the inks as described above are adhered. The drying step as described above may be performed between the steps described above or may be performed after all the steps described above are performed.

3 Recorded Matter

By the ink set and the recording method of the present disclosure described above, a recorded matter can be obtained.

The recorded matter according to the present disclosure is excellent in durability of the smell by the fragrance.

Heretofore, although the preferable embodiments of the present disclosure have been described, the present disclosure is not limited thereto.

EXAMPLES

Next, concrete examples of the present disclosure will be described.

4 Preparation of Fragrant Ink

Preparation Example A1

Microcapsules having a shell thickness of 30 nm and an average particle diameter of 300 nm and including a shell material formed from an urethane resin to enclose a mint fragrance, propylene glycol, Silface SAG503A (manufactured by Nissin Chemical Industry Co., Ltd.) as an acetylene-based surfactant, and water were mixed together at a mass ratio of 1.00:20.00:0.25:78.75, so that a fragrant ink was obtained. The fragrant ink had a viscosity of 4.5 mPa·s.

Preparation Examples A2 to A15

Except for that the types and the amounts of the components used for preparation of the fragrant inks were changed so as to obtain the compositions shown in FIG. 1, fragrant inks were prepared in a manner similar to that of the above Preparation Example A1.

The conditions of the fragrant inks prepared in Preparation Examples A1 to A15 are collectively shown in FIG. 1.

In addition, in FIG. 1, a microcapsule having a shell thickness of 30 nm and an average particle diameter of 300 nm and including a shell material formed from an urethane resin to enclose a mint fragrance at a content of 50 percent by mass is represented by "microcapsule 1", a microcapsule having a shell thickness of 30 nm and an average particle diameter of 220 nm and including a shell material formed from an urethane resin to enclose a mint fragrance at a content of 50 percent by mass is represented by "microcapsule 2", a microcapsule having a shell thickness of 30 nm and an average particle diameter of 200 nm and including a shell material formed from an urethane resin to enclose an orange fragrance at a content of 50 percent by mass is represented by "microcapsule 3", a microcapsule having a shell thickness of 30 nm and an average particle diameter of 220 nm and including a shell material formed from a melamine resin to enclose a mint fragrance at a content of 50 percent by mass is represented by "microcapsule 4", a microcapsule having a shell thickness of 200 nm and an average particle diameter of 1,000 nm and including a shell material formed from an urethane resin to enclose a mint fragrance at a content of 50 percent by mass is represented by "microcapsule 5", a microcapsule having a shell thickness of 300 nm and an average particle diameter of 110 μm and including a shell material formed from an urethane resin to enclose a mint fragrance at a content of 50 percent by mass is represented by "microcapsule 6", a microcapsule having a shell thickness of 3 nm and an average particle diameter of 10 nm and including a shell material formed from an urethane resin to enclose a mint fragrance at a content of 50 percent by mass is represented by "microcapsule 7", a microcapsule having a shell thickness of 3 nm and an average particle diameter of 5 nm and including a shell material formed from an urethane resin to enclose a mint fragrance at a content of 50 percent by mass is represented by "microcapsule 8", a microcapsule having a shell thickness of 500 nm and an average particle diameter of 1,000 nm and including a shell material formed from an urethane resin to enclose a mint fragrance at a content of 50 percent by mass is represented by "microcapsule 9", a mint fragrance not microcapsulized is represented by "non-microcapsulized fragrance", and Silface SAG503A (manufactured by Nissin Chemical Industry Co., Ltd.) is represented by "SAG503A". The unit of the content of each component in FIG. 1 is percent by mass.

5 Preparation of Color Ink

Preparation Example B1

C. I. Pigment Blue 15:3 as a colorant, resin particles formed from a polyurethane resin and having an average particle diameter of 120 nm, glycerin, propylene glycol, Silface SAG503A (manufactured by Nissin Chemical Industry Co., Ltd.) as an acetylene-based surfactant, and pure water were mixed together at a mass ratio of 10.00:10.00, 15.00:5.00:0.25:59.75, so that a color ink was obtained. The color ink had a viscosity of 5.5 mPa·s.

Preparation Examples B2 and B3

Except for that the types and the amounts of the components used for preparation of the color inks were changed so as to obtain the compositions shown in FIG. 2, color inks were prepared in a manner similar to that of above Preparation Example B1.

The conditions of the color inks prepared in Preparation Examples B1 to B3 are collectively shown in FIG. 2. In addition, in FIG. 2, C.I. Pigment Blue 15:3 as a blue pigment is represented by "PB15:3", titanium dioxide as a white pigment is represented by "$TiO_2$", C.I. Direct Blue 87 as a direct dye is represented by "DB87", resin particles formed from a polyurethane resin and having an average particle diameter of 0.1 μm is represented by "resin particles", and Silface SAG503A (manufactured by Nissin Chemical Industry Co., Ltd.) is represented by "SAG503A". The unit of the content of each component in FIG. 2 is percent by mass. In addition, the viscosities of the color inks of Preparation Examples B1 to B3 were all in a range of 2 to 20 mPa·s.

6 Manufacturing of Recorded Matter

Example 1

The fragrant ink prepared in above Preparation Example A1 and the color ink prepared in above Preparation Example B1 were used in combination as the ink set.

By the use of this ink set, a recorded matter in which a recorded portion was formed on a cotton broadcloth used as the cloth was obtained. In more particular, by using an ink jet printer (PX-G930, manufactured by Seiko Epson Corporation), since the fragrant ink and the color ink were ejected in the same main scanning, those inks were adhered to the cloth used as the recording medium so as to be overlapped with each other thereon, and as a result, the recorded matter was obtained.

Examples 2 to 19

Except for that the combination between the inks to form the ink set and the printing method were selected as shown in FIGS. 3 and 4, the recorded matters were manufactured in a manner similar to that of above Example 1.

Comparative Example 1

Except for that the combination between the inks to form the ink set and the printing method were selected as shown in FIG. 4, the recorded matter was manufactured in a manner similar to that of above Example 1.

7 Evaluation

The inks used in Examples and Comparative Examples and the recorded matters obtained therefrom were evaluated as described below.

7-1 Ejection Stability

The inks used in Examples and Comparative Examples were each filled in an ink jet printer (PX-G930, manufactured by Seiko Epson Corporation) and then recorded on a A4-size clear proof film (manufactured by Seiko Epson Corporation) as the recording medium. In particular, a solid pattern recordable at a duty of 100% was formed at a resolution of 720 dpi in a lateral direction and 720 dpi in a vertical direction. After the printing was performed on 100 recording media, the number of missing nozzles was confirmed and then evaluated in accordance with the following criteria. As the number described above is smaller, the ejection stability can be said as excellent.

AA: no missing nozzles are observed.

A: number of missing nozzles is 1 to 5.

B: number of missing nozzles is 6 to 20.

C: number of missing nozzles is 21 or more 7-2 Clogging Recovery Property

The inks used in Examples and Comparative Examples were each filled in an ink jet printer (PX-G930, manufactured by Seiko Epson Corporation) and then left for one month in a cap opening state. Subsequently, after cleaning was performed three times, the number of missing nozzles was confirmed and then evaluated in accordance with the following criteria. As the number described above is smaller, the clogging recovery property can be said as excellent.

A: no missing nozzles are observed.

B: number of missing nozzles is 1 to 5.

C: number of missing nozzles is 6 to 20.

D: number of missing nozzles is 21 or more 7-3 Durability of Smell 7-3-1 Evaluation with Time After the recorded matters manufactured in Examples and Comparative Examples were left for 24 hours after the manufacturing thereof, recording surfaces of printed portions were rubbed 10 times with fingers of five evaluators, and immediately thereafter, the fingers thereof were smelled and then judged in a manner such that "no smell was rated at 0 point", "slight fragrant smell was rated at 1 point", "weak fragrant smell was rated at 2 points", and "strong fragrant smell was rated at 3 points". Subsequently, the same evaluation as described above was further performed every 24 hours. The average point at each time stage was obtained from the points of the five evaluators, and when the average point thus obtained was 1 point or higher, the smell was judged as lasting and was evaluated in accordance with the following criteria. As a lasting time of the smell is longer, the durability of the smell can be said as excellent. The temperature of the environment in which each recorded matter was left was 25° C.

A: Lasting time of smell is 30 days or more.

B: Lasting time of smell is 3 to less than 30 days.

C: Lasting time of smell is less than 3 days.

7-3-2 Dry Friction Resistance

The recorded matters manufactured in Examples and Comparative Examples were each left in an environment at 25° C. for one hour after the manufacturing thereof, and recording surfaces of the recorded matters were then each rubbed 20 times by a dry cotton cloth with a load of 200 g using a Gakushin Fastness Rubbing Tester AB-301 (manufactured by Tester Sangyo Co., Ltd.), so that samples were formed.

The recording surfaces of printed portions of those samples were rubbed 10 times with fingers of five evaluators, and immediately thereafter, the fingers thereof were smelled and then judged in a manner such that "no smell was rated at 0 point", "slight fragrant smell was rated at 1 point", "weak fragrant smell was rated at 2 points", and "strong fragrant smell was rated at 3 points". The average point was obtained from the points of the five evaluators and was evaluated in accordance with the following criteria. As the average point is higher, the durability of the smell can be said as excellent.

A: average point is 2 or higher.

B: average point is 1 to less than 2.

C: average point is 0 to less than 1.

7-3-3 Wet Friction Resistance

The recorded matters manufactured in Examples and Comparative Examples were each left in an environment at 25° C. for one hour after the manufacturing thereof, and recording surfaces of the recorded matters were then each rubbed 20 times by a cotton cloth wetted by pure water with a load of 200 g using a Gakushin Fastness Rubbing Tester AB-301 (manufactured by Tester Sangyo Co., Ltd.), so that samples were formed.

The recording surfaces of printed portions of those samples were rubbed 10 times with fingers of five evaluators, and immediately thereafter, the fingers thereof were smelled and then judged in a manner such that "no smell was rated at 0 point", "slight fragrant smell was rated at 1 point", "weak fragrant smell was rated at 2 points", and "strong fragrant smell was rated at 3 points". The average point was obtained from the points of the five evaluators and was evaluated in accordance with the following criteria. As the average point is higher, the durability of the smell can be said as excellent.

A: average point is 2 or higher.

B: average point is 1 to less than 2.

C: average point is 0 to less than 1.

7-3-4 Washing Fastness

The recorded matters manufactured in Examples and Comparative Examples were each left in an environment at 25° C. for one hour after the manufacturing thereof and were then subjected to a washing fastness test of ISO 105 C10 (B2), so that samples were formed.

Recording surfaces of printed portions of those samples were rubbed 10 times with fingers of five evaluators, and immediately thereafter, the fingers thereof were smelled and then judged in a manner such that "no smell was rated at 0 point", "slight fragrant smell was rated at 1 point", "weak fragrant smell was rated at 2 points", and "strong fragrant smell was rated at 3 points". The average point was obtained from the points of the five evaluators and was evaluated in accordance with the following criteria. As the average point is higher, the durability of the smell can be said as excellent.

A: average point is 2 or higher.

B: average point is 1 to less than 2.

C: average point is 0 to less than 1.

Those results are collectively shown in FIGS. 3 and 4 together with the types of inks forming the ink sets and the printing methods. In addition, in FIGS. 3 and 4, a method in which by using an ink jet printer (PX-G930, manufactured by Seiko Epson Corporation), the fragrant ink and the color ink are ejected in the same main scanning and are adhered to a cloth used as the recording medium so as to be overlapped with each other thereon is represented by "simultaneous printing", a method in which by using an ink jet printer (PX-G930, manufactured by Seiko Epson Corporation), the fragrant ink and the color ink are ejected in different main scannings and are adhered to a cloth used as the recording medium so as to be overlapped with each other thereon is represented by "dual head printing", and a method in which by using an ink jet printer (PX-G930, manufactured by Seiko Epson Corporation), printing is performed by dividing the nozzles into top half nozzles and bottom half nozzles is represented by "nozzle division printing".

As apparent from FIGS. 3 and 4, excellent results could be obtained by the present disclosure. On the other hand, in Comparative Example, satisfied results could not be obtained.

What is claimed is:

1. A recording method comprising:

a fragrant ink adhesion step in which at least one fragrant ink containing microcapsules which enclose a fragrance is ejected by an ink jet method and is adhered to a recording medium; and a color ink adhesion step in which at least one color ink containing a colorant, resin particles, and water is ejected by an ink jet method and is adhered to the recording medium, wherein the fragrant ink and the color ink are adhered to the recording medium so as to be at least partially overlapped with each other thereon, and wherein the microcapsules have an average particle diameter of 10 nm to 300 nm.

2. The recording method according to claim 1, wherein the fragrant ink adhesion step and the color ink adhesion step are performed in the same main scanning.

3. The recording method according to claim 1, wherein the number of fragrant inks to be used in combination is at least two.

4. The recording method according to claim 1, wherein the fragrant ink adhesion step includes at least a preceding main scanning and a succeeding main scanning, and the fragrant ink is adhered by the succeeding main scanning so as to be at least partially overlapped with a region to which the fragrant ink is adhered by the preceding main scanning.

5. The recording method according to claim 1, wherein the colorant includes a pigment.

6. The recording method according to claim 1, wherein the fragrant ink contains a moisturizer.

7. The recording method according to claim 1, wherein the fragrant ink contains a surfactant.

8. The recording method according to claim 1, wherein the fragrant ink contains resin particles at a content of 0.1 percent by mass or less.

9. The recording method according to claim 1, wherein the fragrant ink and the color ink each have a viscosity of 2 to 20 mPa·s.

10. The recording method according to claim 1, wherein the microcapsules are formed of a material containing at least one selected from the group consisting of an urethane resin and a melamine resin.

11. The recording method according to claim 1, wherein the microcapsules have a shell thickness of 0.3 μm or less.

12. The recording method according to claim 1, wherein the recording medium includes a cloth.

13. An ink set which includes at least two types of inks to be ejected by an ink jet method, the ink set comprising:

a fragrant ink containing microcapsules which enclose a fragrance, and a color ink containing a colorant, resin particles, and water.

* * * * *